US006043968A

United States Patent [19]

Haruki

[11] Patent Number: 6,043,968

[45] Date of Patent: Mar. 28, 2000

[54] ESD PROTECTION CIRCUIT

[75] Inventor: Tadashi Haruki, Tokyo, Japan

[73] Assignee: NEC Corporation, Tokyo, Japan

[21] Appl. No.: 09/099,406

[22] Filed: Jun. 18, 1998

[30] Foreign Application Priority Data

Jun. 20, 1997 [JP] Japan .................................... 9-180601

[51] Int. Cl.[7] ....................................................... H02H 9/00

[52] U.S. Cl. ............................... 361/111; 361/56; 361/58; 361/91.1

[58] Field of Search ................................. 361/56, 58, 91, 361/111, 118, 119; 327/433

[56] References Cited

U.S. PATENT DOCUMENTS

| | | | |
|---|---|---|---|
| 5,319,252 | 6/1994 | Pierce et al. | 307/263 |
| 5,543,734 | 8/1996 | Volk et al. | 326/83 |
| 5,576,654 | 11/1996 | Shu et al. | 327/433 |

FOREIGN PATENT DOCUMENTS

| | | | |
|---|---|---|---|
| 2-1954 | 1/1990 | Japan | H01L 21/82 |
| 5-75433 | 3/1993 | Japan | H03K 19/0185 |
| 6-112422 | 4/1994 | Japan | H01L 27/04 |

*Primary Examiner*—Stephen W. Jackson
*Attorney, Agent, or Firm*—Sughrue, Mion, Zinn Macpeak & Seas, PLLC

[57] ABSTRACT

An inverter is connected between an external GND terminal and a drain of an internal circuit such that the drain of the internal circuit is not directly connected to the external GND terminal. As a result, even when the input of a transfer gate of the internal circuit is to be at a GND level, it is possible to prevent any current flowing to VDD from the drain of a p-type transistor through a well and to prevent electrons from flowing into an external power supply potential VDD terminal from the drain of an n-type transistor. Thus, the internal circuit can be protected from ESD even when static electricity is applied to an external power supply terminal or GND terminal.

4 Claims, 2 Drawing Sheets

ESD PROTECTION CIRCUIT

BACKGROUND OF THE INVENTION

1. Field of the Invention

The present invention relates to an ESD protection circuit and, more particularly, to a protection circuit for a transfer gate circuit connected to a power supply or a GND level.

2. Description of the Related Art

ESD (electrostatic damage) protection circuits of this type have been used to protect an internal circuit from ESD as described in, for example, Japanese patent Application Laid-Open No. 2-1954.

FIG. 1 illustrates an embodiment of circuitry of a conventional ESD protection circuit. Referring to FIG. 1, the drains of a p-type MOS transistor 11 and an n-type MOS transistor 12 as protection devices are connected to a line connecting an external terminal 10 and an internal circuit 8. The source and gate of the p-type MOS transistor 11 are both connected to a power supply potential VDD 2 and the source and gate of the n-type MOS transistor 12 are both connected to a ground potential GND 3 to form diodes, respectively. The internal circuit 8 has an internal circuit 82 with a p-type MOS transistor 821 and an n-type MOS transistor 822 which are connected to the external terminal 10 and a transfer gate circuit 81 with a p-type MOS transistor 811L and an n-type MOS transistor 812.

An external ground potential GND terminal 1 has a protection circuit consisting of a p-type MOS transistor 4 and an n-type MOS transistor 5. The drains of the transistors 4 and 5 are connected to a line connecting the external terminal 1 and the internal circuit 8. The source and gate of the p-type MOS transistor 4 are both connected to a power supply potential VDD and the source and gate of the n-type MOS transistor 5 are both connected to a ground potential GND to form diodes, respectively.

The p-type MOS transistor 11 has a structure wherein its well is open to prevent any current from flowing into the power supply VDD of the internal circuit 8 from the drain of the p-type MOS transistor 11 through the well even when static electricity at a high positive voltage is applied to the external terminal 10.

Further, when it is desired to disable a circuit such as a flip-flop which receives an input signal at the transfer gate circuit 81, the input of the transfer gate circuit 81 has been switched by a master slice 13 such that it is disconnected from an output signal of the internal circuit 82 and is directly connect to an external ground potential GND) terminal 1 having protection circuits consisting or the p-type MOS transistor 4 and the p-type MOS transistor 5.

According to the conventional technique shown in FIG. 1, however, since static electricity at a high voltage is directly applied to the drains of the p-type and n-type MOS transistors 821, 822 of the internal circuit 82, there is a problem in that ESD occurs when the transfer gate 81 of the internal gate is switched by the master slice 13 to the external ground potential GND.

SUMMARY OF THE INVENTION

It is an object of the present invention to provide an ESD protection circuit capable of protecting an internal circuit from ESD even when static electricity is applied to an external power supply terminal or a GND terminal.

An ESD protection circuit according to the present invention is configured such that the input of a transfer gate of an internal circuit is not directly connected to an external ground potential GND terminal when the input is to have the ground potential GND.

Specifically, an ESD protection circuit according to a first aspect of the present invention is characterized in that it comprises one or a plurality of inverters connected between an external power supply terminal or external GND terminal and drains of an internal circuit of which are to be at the power supply potential or GND potential such that the inverters prevent the drains of the internal circuit from being directly connected to the external power supply terminal or the external GND terminal.

An ESD protection circuit according to a second aspect of the invention is characterized in that it comprises CMOS inverters inserted in a line between an external GND terminal and a drain of an internal gate in the form of a two-stage cascade such that the drain of the internal gate is not directly connected to the external GND terminal.

An ESD protection circuit according to a third aspect of the invention is characterized in that it comprises a CMOS inverter in a line between an external power supply terminal and a drain of an internal gate such that the drain of the internal gate is not directly connected to the external power supply terminal.

According to the present invention, since a configuration is employed wherein no static electricity at a high voltage is directly applied to a drain of an internal circuit, the internal circuit can be protected from ESD even when static electricity is applied to an external power supply terminal or GND terminal.

DESCRIPTION OF THE PREFERRED EMBODIMENTS

Preferred embodiments of the present invention will now be specifically described with reference to the accompanying drawings.

Figure 1:
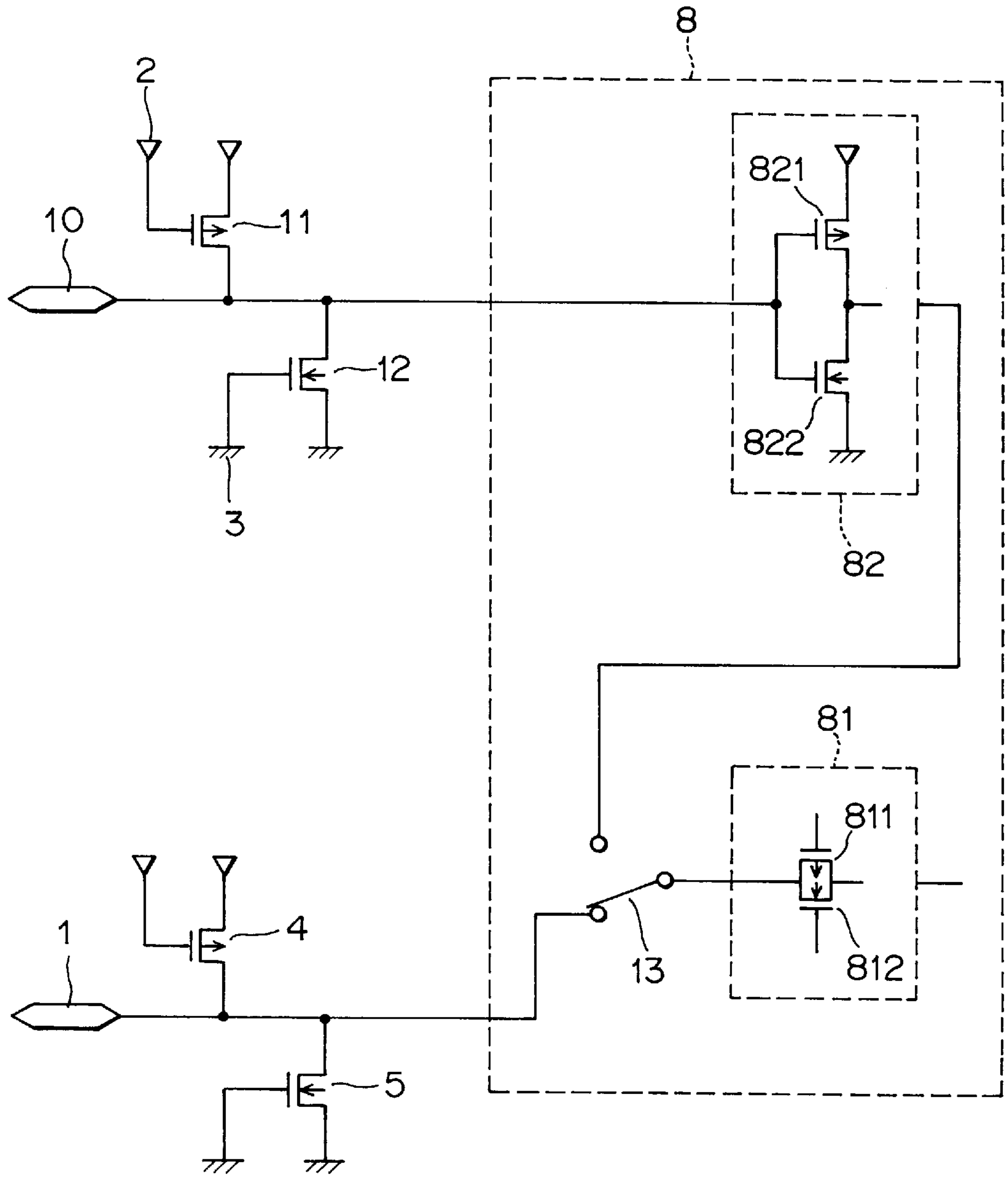
FIG. 1 is a circuit diagram of a conventional ESD protection circuit.
Figure 2:
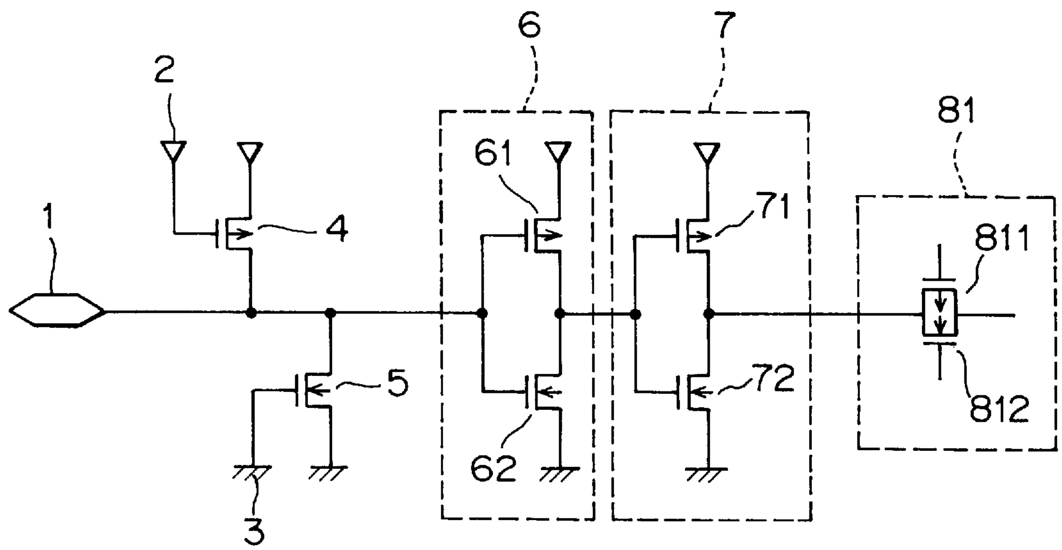
FIG. 2 is a circuit diagram showing a configuration of an ESD protection circuit according to an embodiment of the present invention.

FIG. 2 is a diagram showing a configuration of an embodiment of the present invention. As shown in FIG. 2, the drains of a p-type MOS transistor 4 and an n-type MOS transistor 5 as protection elements are connected to a line which is connected to an external ground potential GND terminal 1. The source and gate of the p-type MOS transistor 4 are connected to a power supply potential VDD 2 and the source and gate of the n-type MOS transistor 5 are connected to a ground potential GND 3, so that a diode is formed by the p-type MOS transistor 4 and n-type MOS transistor 5. The well of the p-type MOS transistor 4 is electrically open to provide a configuration wherein no current flows to a power supply VDD of an internal circuit through the well from the drain of the p-type MOS transistor 4 even when static electricity at a positive high voltage is applied from the external ground potential GND terminal 1.

Further, the gates of a p-type MOS transistor 61 and an n-type MOS transistor 62 which form an inverter 6 are connected to a line which is connected to the external ground potential GND terminal 1, and the output of the inverter 6 is connected to a gate of a p-type MOS transistor 71 and an n-type MOS transistor 72 which form an inverter 7. The output of the inverter 7 is connected to an internal transfer gate circuit 81 such that a signal at the level of the ground potential GND is supplied to an input of an internal transfer gate circuit 81 with a p-type MOS transistor 811 and an n-type MOS transistor 812.

In the 9 ESD protection circuit of the present embodiment having such a configuration, the p-type MOS transistor 4 and n-type MOS transistor 5 having the function of a diode make it possible to reduce ESD as in the prior art. In the present embodiment, since the inverters 6 and 7 are connected between the external ground potential GND terminal 1 and the transfer gate circuit 81 whose input is at the ground potential GND, static electricity at a positive high voltage applied to the external ground potential GND terminal 1 will not be directly applied to the drain of the p-type MOS transistor 811. This makes it possible to prevent any current from flowing to the power supply VDD of the internal circuit. Further, even if static electricity at a positive high voltage is applied to the external power supply potential VDD terminal, it is possible to prevent electrons from flowing from the drain of the n-type MOS transistor 812 to the terminal at the external power supply potential VDD.

Figure 3:
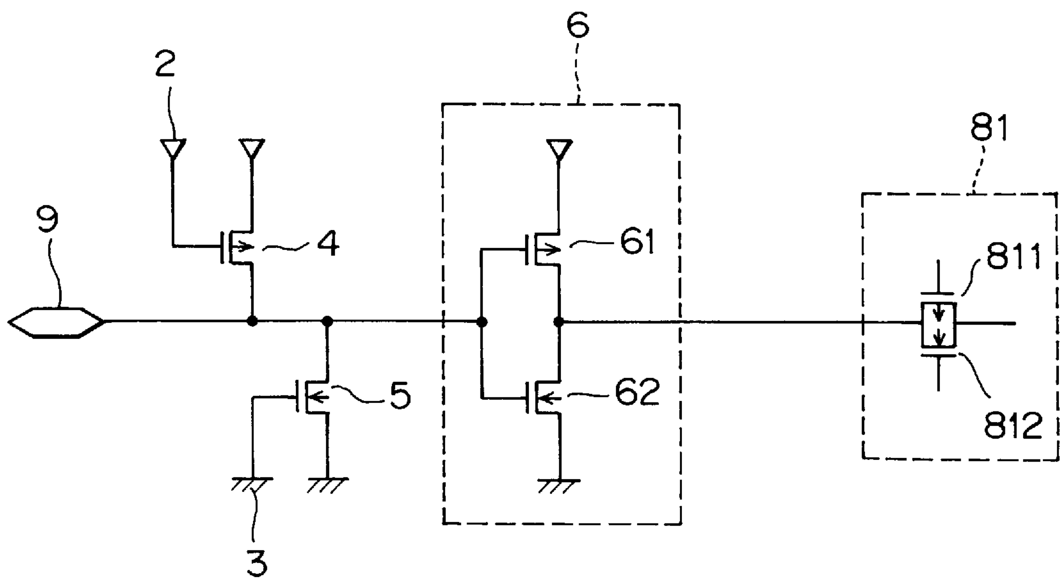
FIG. 3 is a circuit diagram showing a configuration of an ESD protection circuit according to another embodiment of the present invention.

FIG. 3 is a diagram showing a configuration of a second embodiment of the present invention. As shown in FIG. 3, the drains of a p-type MOS transistor 4 and an n-type MOS transistor 5 as protection devices are connected to a line which is connected to an external power supply potential VDD terminal 9. The source and gate of the p-type MOS transistor 4 are connected to a power supply potential VDD 2 and the source and gate of the n-type MOS transistor 5 are connected to a ground potential GND 3, so that both consist of diodes. The well of the p-type transistor 4 is electrically open to provide a configuration wherein no current flows to a power supply VDD of an internal circuit through the well from the drain of the p-type MOS transistor 4 even when static electricity at a positive high voltage is applied from the external power supply potential VDD terminal 9. The line connected to the external power supply potential VDD terminal 9 is connected to the gates of a p-type MOS transistor 61 and an n-type MOS transistor 62 that form an inverter 6. The output of the inverter 6 is connected to a transfer gate 81 which is an internal circuit such that a signal at the level of the ground potential GND is supplied to inputs of transfer gates 811 and 812.

As described above, an ESD protection circuit according to the present invention has means (inverters 6 and 7 in FIGS. 2 and 3) for preventing the input of a transfer gate of an internal circuit from being directly connected to an external ground potential GND terminal when it is to be at the ground potential GND.

As a result, the input of the transfer gate of the internal circuit receives an output signal of the inverter and will not directly receive static electricity at a high voltage. That is, even when the input of the transfer gate of the internal circuit is to be at the GND level, it is possible to prevent any current flowing to the VDD from the drain of the p-type transistor through the well and to prevent electrons from flowing into the external power supply potential VDD terminal from the drain of the n-type transistor.

What is claimed is:

1. An ESD protection circuit comprising:

CMOS inverters inserted in a line between an external GND terminal and a drain of an internal gate in the form of a two-stage cascade, wherein the drain of said internal gate is not directly connected to said external GND terminal.

2. The ESD protection circuit of claim 1, wherein said CMOS inverters are connected in series.

3. The ESD protection circuit of claim 1, wherein said two-stage cascade comprises a first and a second inverters.

4. The ESD protection circuit of claim 3, wherein said first inverter comprises a first n-type and a first p-type transistors, and said second inverter comprises a second n-type and a second p-type transistors, and wherein said first p-type and said first n-type transistors are connected to said external GND terminal, an output of said first inverter is connected to gates of said second p-type and said second n-type transistors, and an output of said second inverter is connected to said drain of said internal gate.

* * * * *